Jan. 8, 1929.  E. A. BANSCHBACH  1,698,182
BUFFER
Original Filed April 17, 1922
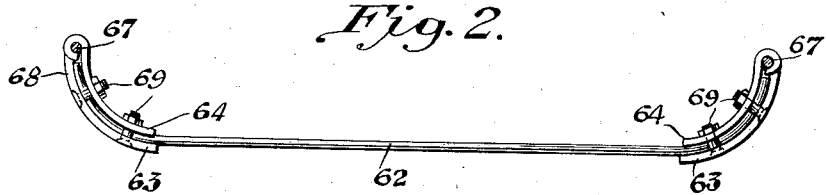
Inventor
Edward A. Banschbach
By Kent W. Wonnell
Atty.

Patented Jan. 8, 1929.

1,698,182

UNITED STATES PATENT OFFICE.

EDWARD A. BANSCHBACH, OF CHICAGO, ILLINOIS.

BUFFER.

Original application filed April 17, 1922, Serial No. 553,462, now Patent No. 1,647,766, dated November 1, 1927. Divided and this application filed October 3, 1927. Serial No. 223,855.

This invention relates to a vehicle buffer particularly designed and intended for use with motor vehicles and having more particular reference to the specific form of the bumper bar and the means for connecting and reinforcing the bar at the ends thereof.

One of the principal objects of the present invention is in the provision of improved means for connecting together the ends of a number of cross bars which, when united, form a buffer of great strength, able to withstand front and side impacts without breaking or distortion.

A further object of the invention is to provide connecting elements at the ends of a buffer bar which are united and strengthened by a common connecting bar or pin.

Other objects will appear hereinafter, the accompanying drawing illustrating a preferred embodiment of the invention.

In the drawing,

Figure 1 is a view of a hinged end of a connecting device of a buffer constructed in accordance with the principles of this invention; and Figure 2 is a top view of a buffer of this kind partly broken away in the center and with a pin at one end shown in section.

This application is a division of original application No. 553,462, filed April 17, 1922, which has become Patent No. 1,647,766 and the present application is directed to the particular manner of connecting the ends of a multiple bar buffer.

Instead of uniting the ends of a multiple bar by means of a single plate which overlaps and encloses the extremities of these bars, the present invention proposes a two-piece hinged plate which may be secured to the ends of the bars, each plate being formed with a loop or eye through which a hinged pin is inserted for connecting together and strengthening the plates and the buffer at its ends.

Referring more particularly to the drawings, a plurality of bars 62 which are of a length to extend across the front of a vehicle, such as an automobile, at the ends of which are hinge plates 63 and 64 positioned on opposite sides of the bars 62 and connected thereto by means of clamping bolts 69. The extremities of the plates are formed with eyes or loops 65 and 66 arranged alternately and in line with each other so that a single bolt or pin 67 may be inserted therethrough, uniting the plates, holding them together at the ends and materially strengthening and aligning the buffer, preventing the dislocation of the individual bars 62.

The extremities of the pin 67 may be formed with heads 70 at one or both ends, and the plates 63 and 64 are adapted to swing apart like a hinge when they are not attached to the cross bars. It is not necessary, however, that the hinges be thus assembled before application to the bars 62 as the plates may be attached separately and the pin 67 thereafter inserted, as explained, the heads on the pin or at least one of them being formed after the pin is in place.

As illustrated in the drawings, the plates are curved at the ends of the bars 62, the extremities of the bars being correspondingly curved to fit between the plates 63 and 64. This in itself adds strength and rigidity and affords a lateral bumper surface, but it should be understood that the plates may be applied to the straight extremities of a number of bars with the pin 67 connecting them, as above described, without departing from the scope of this invention.

I claim:

1. In a buffer of the class described, a plurality of separate bars arranged in a single plane, and attaching means comprising a two-piece hinged guard secured to and extending over the ends of the bars for connecting them to form a unitary impact member.

2. In a buffer of the class described, a plurality of transverse impact members and means for uniting the members at the ends, said means comprising plates with eyes at the end and means including a pin insertable through the eyes for connecting and strengthening the plates.

3. In a buffer of the class described, a plurality of bars arranged in a vertical plane, and means for connecting the bars together at their ends comprising opposite plates with eyelets projecting in alignment, and a pin insertable through the eyelets for connecting the plates.

4. In a buffer of the class described, a plurality of separate bars, connecting means comprising plates having openings which register with eyelets at the ends of the bars, and connecting pins for uniting the bars and plates through the openings and the eyelets.

5. In a buffer, the combination with a plurality of separate transverse impact members, and means for uniting the impact members together at the ends, said means comprising pins and plates having alternate eyelets through which the pins are inserted for uniting them.

6. A built-up buffer comprising a plurality of transverse bars curved at the ends, and means for uniting the curved ends, said means comprising opposite curved plates having eyelets which are in alignment and are alternately disposed, and a connecting pin inserted through the eyelets for holding the plates together.

7. In a buffer, a plurality of separate bars, a pair of plates extending on opposite sides of the bars at each extremity thereof, means for clamping the bars between the plates, and an additional support at the ends of the plates consisting of a pin and eyelet connection between them.

8. In a built-up bumper, a plurality of horizontal impact members, connecting end plates, and pin and eyelet means in the plates and at the ends of the members for connecting them together.

9. In a built-up bumper, a plurality of horizontal impact members, and pin and eyelet means at the ends for uniting the members into an independent unitary bumper bar.

EDWARD A. BANSCHBACH.